(12) United States Patent
Madheswaran et al.

(10) Patent No.: US 9,386,747 B2
(45) Date of Patent: Jul. 12, 2016

(54) STALK ROLL INTEGRATED CROP SCRAPER

(71) Applicant: AGCO Corporation, Hesston, KS (US)

(72) Inventors: Marudhu Madheswaran, Hesston, KS (US); Randall Lohrentz, Buhler, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 14/701,625

(22) Filed: May 1, 2015

(65) Prior Publication Data

US 2015/0319926 A1     Nov. 12, 2015

Related U.S. Application Data

(60) Provisional application No. 61/989,565, filed on May 7, 2014.

(51) Int. Cl.
| | |
|---|---|
| *A01D 45/02* | (2006.01) |
| *A01D 45/10* | (2006.01) |
| *A01D 57/22* | (2006.01) |
| *A01D 91/04* | (2006.01) |

(52) U.S. Cl.
CPC .............. *A01D 45/025* (2013.01); *A01D 57/22* (2013.01); *A01D 91/04* (2013.01)

(58) Field of Classification Search
CPC ........................... A01D 45/021; A01D 45/025
USPC .................................... 56/110, 62; 460/27, 32
See application file for complete search history.

(56) References Cited

U.S. PATENT DOCUMENTS

| 1,945,364 | A | * | 1/1934 | Coultas | A01D 45/025 56/104 |
|---|---|---|---|---|---|
| 2,180,594 | A | * | 11/1939 | Kuhlman | A01D 45/025 241/DIG. 30 |
| 2,318,291 | A | * | 5/1943 | Christiance | A01D 45/028 56/14.2 |
| 2,334,945 | A | * | 11/1943 | Mitchell | A01D 45/025 56/104 |
| 2,538,965 | A | * | 1/1951 | Fergason | A01D 45/025 460/27 |
| 2,618,113 | A | * | 11/1952 | Hyman | A01D 45/025 460/29 |
| 2,927,414 | A | * | 3/1960 | Jones | A01D 45/025 460/29 |
| 3,101,579 | A | * | 8/1963 | Karlsson | A01D 45/021 56/105 |

(Continued)

FOREIGN PATENT DOCUMENTS

| DE | 19811156 A1 | * | 9/1999 | ......... A01D 45/025 |
|---|---|---|---|---|
| WO | WO 2012152866 A1 | * | 11/2012 | ......... A01D 45/025 |

*Primary Examiner* — Árpád Fábián-Kovács (57) ABSTRACT

A row unit for a corn header has a gearbox with a cast body and first and second rotatable shafts and first and second openings. The first and second shafts extend out respectively from the first and second openings. The row unit also has first and second rotatable stalk rolls arranged fore and aft, the stalk rolls being coupled to the first and second shafts at the aft end and coupled on the fore end to first and second cast supports. The first and second cast supports are secured to a frame of the row unit. Formed from casting the first and second cast supports are respective first and second protrusions, wherein the first and second protrusions include respective first and second knife edges, the first and second knife edges located adjacent the respective first and second stalk rolls.

12 Claims, 5 Drawing Sheets

(56) References Cited

U.S. PATENT DOCUMENTS

| | | | | |
|---|---|---|---|---|
| 3,271,940 A * | 9/1966 | Ashton | A01D 41/141 | 56/105 |
| 3,304,702 A * | 2/1967 | Russell | A01D 45/025 | 56/104 |
| 3,600,876 A * | 8/1971 | Tanzer | A01D 45/025 | 56/104 |
| 3,831,356 A * | 8/1974 | Maiste | A01D 45/021 | 56/10.3 |
| 3,858,384 A * | 1/1975 | Maiste | A01D 45/025 | 56/104 |
| 4,219,990 A * | 9/1980 | Hill | A01D 45/025 | 56/104 |
| 4,233,804 A * | 11/1980 | Fischer | A01D 45/025 | 56/104 |
| 7,752,829 B1 * | 7/2010 | Rottinghaus | A01D 45/021 | 56/110 |
| 7,930,870 B2 * | 4/2011 | Rottinghaus | A01D 45/021 | 56/104 |
| 8,220,235 B2 * | 7/2012 | Kowalchuk | A01D 45/021 | 56/62 |
| 8,402,727 B2 * | 3/2013 | Carboni | A01D 45/021 | 56/60 |
| 8,820,039 B2 * | 9/2014 | Werning | A01D 45/021 | 460/5 |
| 2009/0025353 A1 * | 1/2009 | Christensen | A01D 45/025 | 56/94 |

* cited by examiner

STALK ROLL INTEGRATED CROP SCRAPER

CROSS REFERENCE TO RELATED APPLICATION

This application claims the benefit of U.S. Provisional Application No. 61/989,565, filed May 7, 2014, which is hereby incorporated by reference in its entirety.

BACKGROUND OF THE INVENTION

1. Field of Invention

The present disclosure is generally related to headers for agricultural machines and, more particularly, is related to stalk rolls for corn headers.

2. Description of Related Art

Agricultural harvesters such as combines are typically equipped with a harvesting header. For instance, corn headers are specifically designed to pick up corn, and vary in size (e.g., two row units, twelve row units, etc.). As the harvester moves through the field, each row unit passes between rows of corn. Corn header row units typically use gathering chains or other mechanisms to convey plant material and ears rearward toward a cross auger. A set of driven stalk rolls, which may rotate based on the speed of the harvester, grabs the corn stalks and forces them downward between stripper plates. The ears of corn are snapped free of the stalk, conveyed by the gathering chains toward the cross auger, and the cross auger passes the ears of corn to the feeder housing of the harvester.

In some instances, combine operations entail a risk of plant material wrapping around the stalk roll, which may cause a hindrance to the stalk entering in-between the row unit and possibly result in damage to bearing structures in the row unit.

OVERVIEW OF THE INVENTION

In one embodiment, the invention is directed to a row unit for a corn header has a gearbox with a cast body and first and second rotatable shafts and first and second openings. The first and second shafts extend out respectively from the first and second openings. The row unit also has first and second rotatable stalk rolls arranged fore and aft, the stalk rolls being coupled to the first and second shafts at the aft end and coupled on the fore end to first and second cast supports. The first and second cast supports are secured to a frame of the row unit. Formed from casting the first and second cast supports are respective first and second protrusions, wherein the first and second protrusions include respective first and second knife edges, the first and second knife edges located adjacent the respective first and second stalk rolls.

In another embodiment, the invention is directed to a corn header, having a plurality of row units disposed adjacent each other. Each row unit has a gearbox having a rotatable shaft and a cast body having an opening, the shaft extending out from the opening. A stalk roll has a first end adapted to receive the shaft and an opposing second end, the first end and the second end operably coupled to the shaft. The row unit also has a cast support coupled to the second end, wherein formed from casting at least one of the cast support or the body is a protrusion comprising a knife edge located adjacent the stalk roll.

In another embodiment, the invention is directed to a method including rotating a stalk roll adjacent a fixed cast part, engaging plant material with the rotating stalk roll, and blocking a portion of the plant material using a surface protrusion of the cast part.

These and other features and advantages of this invention are described in, or are apparent from, the following detailed description of various exemplary embodiments of the systems and methods according to this invention.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Certain embodiments of an integrated scraper system and method for a corn header and associated row units and stalk rolls are disclosed that cuts or generally clears wrapping plant material (e.g., crop or plant stalks, stems, leaves, etc.) from around one or more stalk rolls. In one embodiment, the system comprises cast surface protrusions located fore and aft of each stalk roll, the protrusions comprising an integrated component of respective cast parts of a row unit. Each protrusion comprises a knife edge that is proximal to, and adjacent, the rotating stalk roll, such that the protrusion scrapes the plant material engaged by the rotating stalk roll, and the knife edge cuts the plant material and prevents it from wrapping around the stalk roll and possibly preventing rotation and/or damage to internal bearing assemblies.

Digressing briefly, conventional stalk rows may use external components to strip away plant material, which may be subject to increased buildup of plant material and eventual cessation of operations for the respective row unit. In contrast, an integrated scraper system of the disclosed embodiments is formed as part of a casting process of a larger cast part, with the severing or scraping action of the corresponding protrusions with knife edges relative to the rotating stalk rolls eliminating or preventing the buildup of plant material and enabling efficient and reliable operations.

Having summarized certain features of an integrated scraper system of the present disclosure, reference will now be made in detail to the description of the disclosure as illustrated in the drawings. While the disclosure is described in connection with these drawings, there is no intent to limit it to the embodiment or embodiments disclosed herein. For instance, though described in the context of a corn header, other headers with rotating elements adjacent one or more fixed cast parts where the rotating elements are at risk of becoming entangled with plant material may benefit from certain embodiments of an integrated scraper system, and hence such implementations are contemplated to be within the scope of the disclosure. Further, although the description identifies or describes specifics of one or more embodiments, such specifics are not necessarily part of every embodiment. On the contrary, the intent is to cover all alternatives, modifications and equivalents included within the spirit and scope of the disclosure as defined by the appended claims. For instance, though described in the context of fore and aft cast-integrated protrusions, it should be appreciated that certain embodiments of integrated scraper systems may utilize either the fore or aft protrusions, in a cast or forging process (casting and forging treated herein as equivalents). Further, it should be appreciated in the context of the present disclosure that the claims are not necessarily limited to the particular embodiments set out in the description.

Figure 1:
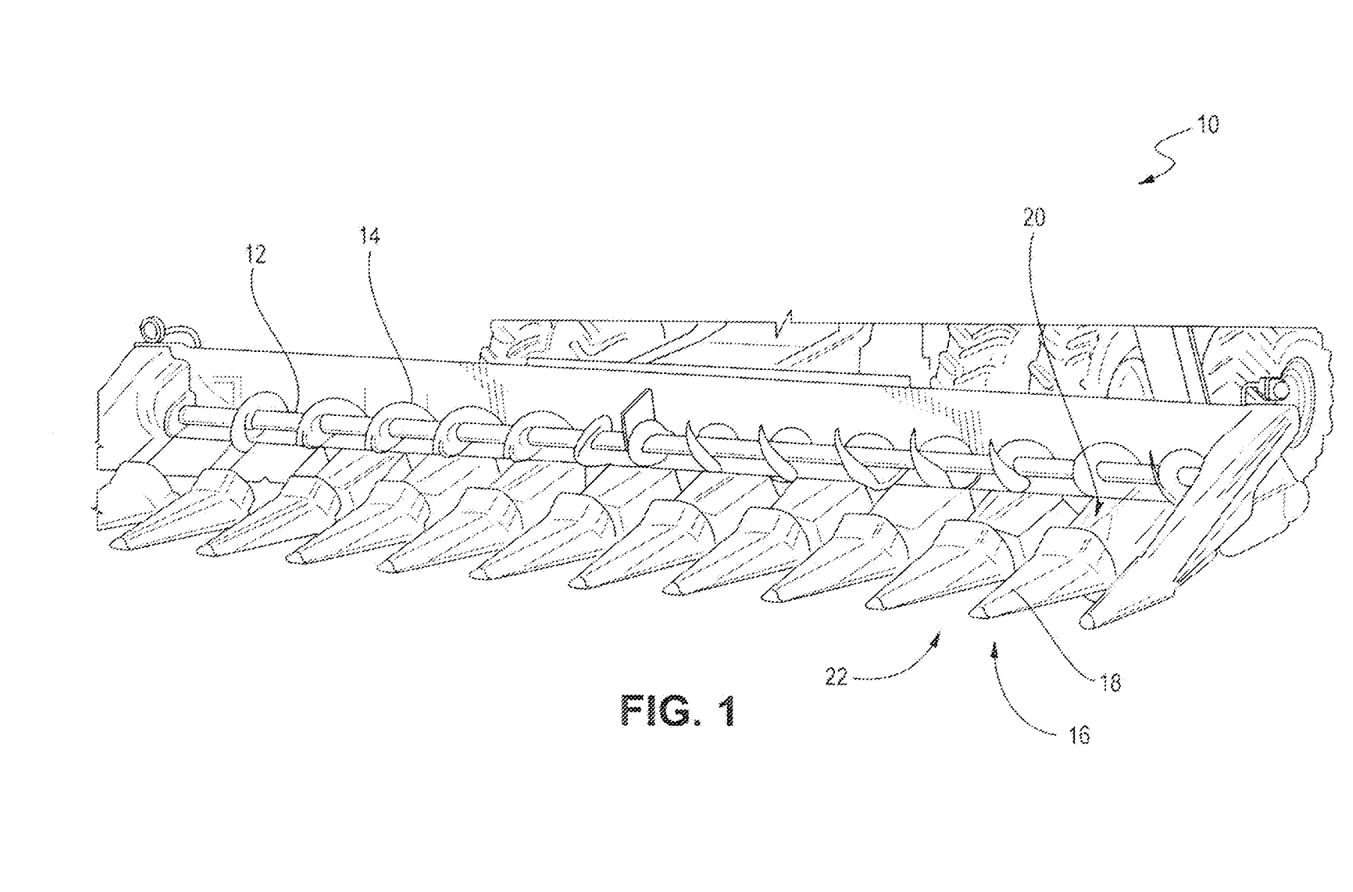
FIG. 1 is a schematic diagram showing a front perspective view of an example corn header with plural row units in which an embodiment of an integrated scraper system may be deployed.

Referring now to FIG. 1, shown is a front perspective view of an example corn header 10 with plural row units in which an embodiment of an integrated scraper system may be deployed. The corn header 10 may be coupled to the front of an agricultural harvester, such as a combine harvester, as is known to those having ordinary skill in the art. The corn header 10 comprises a cross auger 12 with spiral flighting 14 for sweeping the ears of corn toward the center of the header 10. Large cross augers 12 may also have paddles, fingers, or some other structures to facilitate the delivery of the crop rearward to a feeder housing of the combine harvester. The header 10 has a plurality of forward-extending divider assemblies 16, each divider assembly comprising a snout 18 and gatherer hood 20. The header 10 also comprises a plurality of forward extending row units 22, each row unit comprising a set (e.g., pair) of stalk rolls that operate in opposing rotation. In one embodiment, each row unit 22 comprises an integrated scraper system, which may include integrated cast parts or protrusions (i.e., surfaces or structures formed as part of a casting process of a larger cast part) located at the fore end of the pair of stalk rolls, at the aft end of the pair of stalk rolls, or a combination of both the fore and aft end of the pair of stalk rolls. In some embodiments, one or more of the row units (or stalk rolls) may omit an integrated scraper system. One roll of the pair of stalk rows is associated with (e.g., covered by) one of the divider assemblies 16, whereas the other roll of the pair of stalk rolls is associated with an adjacent divider assembly 16. In other words, a divider assembly 16 may cover two stalk rolls from adjacent row units 22.

The row units 22 and the cross auger 12 define a feeder plane therebetween where useable parts of stalk crops are conveyed rearward from the row units 22 to the cross auger 12. One having ordinary skill in the art should appreciate in the context of the present disclosure that the number of row units 22 may differ among different types of corn headers, and that other configurations of corn headers with or without a different quantity of row units are contemplated to be within the scope of the disclosure.

Figure 2:
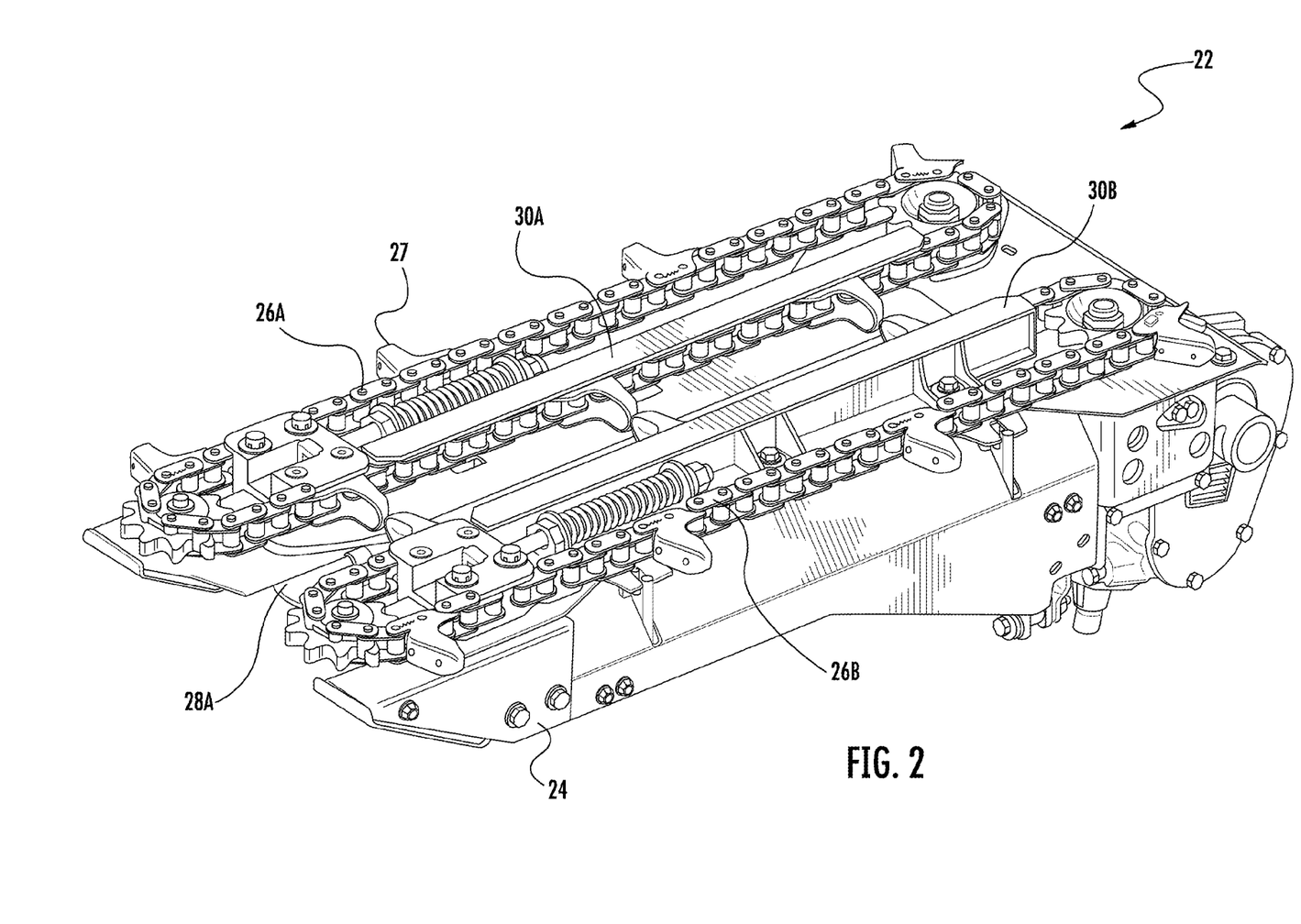
FIG. 2 is a schematic diagram of an example embodiment of a row unit in top perspective view in which an embodiment of an integrated scraper system may be deployed.

Referring to FIG. 2, shown in front perspective, top view, is an example embodiment of a row unit 22. The row unit 22 comprises a frame 24, to which is secured various sub-components. The row unit 22 comprises a set of counter-rotatable, gathering chains 26A, 26B for conveying harvested plant material, such as ears of corn, rearwardly toward the cross auger 12 (FIG. 1). In some embodiments, other mechanisms for conveying the plant material rearwardly may be used, such as one or more augers. As is known, the gathering chains 26A, 26B each comprise plural lugs, such as lug 27, to facilitate the rearward conveyance process. Obscured from view are a pair of stalk rolls of the row unit 22, the stalk rolls illustrated in FIG. 3A.

Figure 3A:
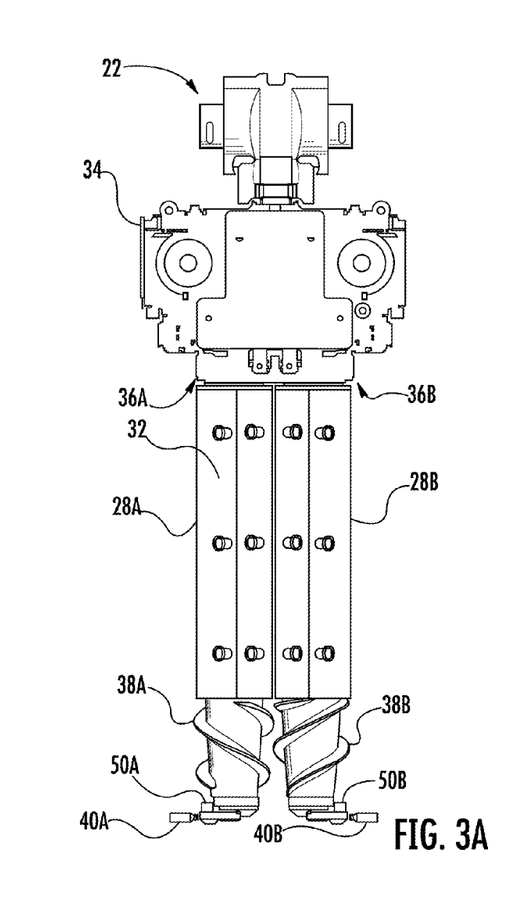
FIG. 3A is a schematic diagram showing in overhead plan, fragmentary view select portions of an embodiment of a row unit in which an embodiment of an integrated scraper system may be deployed.

FIG. 3A is a fragmentary, overhead plan view of the row unit 22 with the gathering chains 26A, 26B and other associated componentry shown in FIG. 2 removed from FIG. 3A. As best seen in FIG. 3A, with continued reference to FIG. 2, the row unit 22 comprises a pair of opposably rotatable (e.g., counter-rotating) stalk rolls 28A, 28B disposed beneath the gathering chains 26A, 26B. The stalk rolls 28A and 28B are illustrated in FIG. 3A with knives, such as knife 32, secured (e.g., via bolts or other securing mechanisms) to an underlying cast structure as is known. The knives 32 facilitate engagement with plant material, though some embodiments may use other stalk roll configurations. In general, the stalk rolls 28A, 28B are operable for pulling the plant material (e.g., stalks, leaves, ears of corn, etc.) downwardly and rearwardly, such that ears of corn are stripped by stripper plates 30A, 30B (shown in FIG. 2), enabling the ears of corn to be conveyed rearward. Also, the stalk rolls 28A, 28B chop and slice the residue to ultimately be discharged to the ground. The row unit 22 also comprises a gearbox 34. The gearbox 34 comprises a cast body or frame, within which includes known internal drive machinery to drive, via output shafts extending through cast (or machined in some embodiments) openings 36A, 36B located proximal the aft end of the stalk rolls 28A, 28B, the rotation of the stalk rolls 28A, 28B. The stalk rolls 28A and 28B include respective helical flute portions 38A, 38B at the fore end of the stalk rolls 28A, 28B to facilitate engagement of the plant material. The respective helical flute portions 38A and 38B are coupled at the fore end to cast supports 40A, 40B, which in turn are secured to the frame 24 (FIG. 2).

Figure 3B:
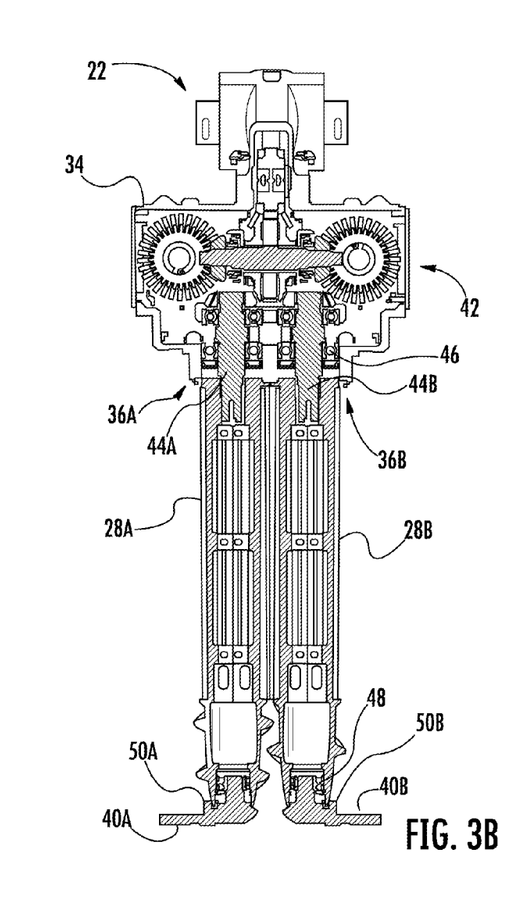
FIG. 3B is a schematic diagram showing in overhead plan, fragmentary, cut-away view select portions of an embodiment of the row unit of FIG. 3A.

Attention is directed to FIG. 3B, which shows in cut-away, fragmentary view, some of the internal features of the row unit 22. At the gearbox 34, known drive machinery 42 of rotating elements, such as plural gears, drive output shafts 44A and 44B, with rotation facilitated by one or more bearing assemblies, such as bearing assembly 46 disposed within the gearbox 34. The output shafts 44A, 44B extend through respective openings 36A, 36B and couple (e.g., via a splined connection) to respective stalk rolls 28A, 28B in known manner. The coupling of the output shafts 44A, 44B to respective stalk rolls 28A, 28B enables a translation of rotation of the output shafts 44A, 44B to the respective stalk rolls 28A, 28B. The stalk rolls 28A, 28B are respectively coupled at the fore end in known manner to the cast supports 40A, 40B via respective bearing assemblies, such as bearing assembly 48. Also shown in FIGS. 3A and 3B is an outline of protrusions 50A and 50B extending from the respective cast supports 40A and 40B. The protrusions 50A and 50B are formed during the casting process that forms the larger respective cast supports 40A and 40B. The protrusions 50A and 50B comprise one embodiment of an integrated scraper system, and are disposed adjacent a fore end of the rotating stalk rolls 28A and 28B, respectively. The protrusions 50A and 50B serve as an interference or obstacle to plant material (e.g., blocks plant material) that starts to wind onto the rotating stalk rolls 28A, 28B, respectively. As explained further below, the protrusions 50A and 50B comprise respective knife edges that sever any plant material engaged by the rotating stalk rolls 28A, 28B that contacts the protrusions 50A and 50B. It should be appreciated by one having ordinary skill in the art that the structure of the row unit 22 depicted in FIGS. 3A and 3B is merely illustrative, and that other structural configurations for a row unit 22 may similarly benefit from certain embodiments of an integrated scraper system and hence are contemplated to be within the scope of the disclosure.

Figure 4:
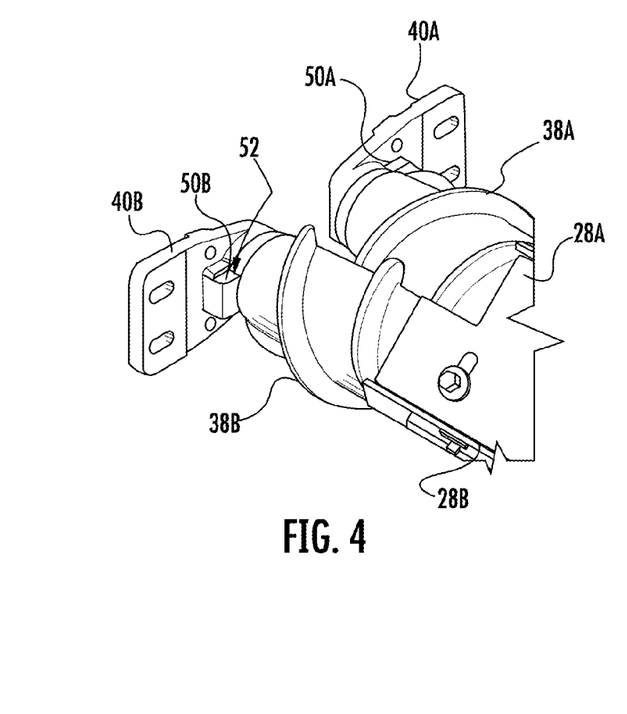
FIG. 4 is a schematic diagram showing a partial perspective view of an embodiment of an integrated scraper system for a fore end of a row unit.

Having described an overview of an example environment in which an embodiment of an integrated scraper system may be deployed, attention is directed to FIG. 4, which illustrates a fore end portion of an embodiment of the integrated scraper system. Depicted in FIG. 4 are the helical flute portions 38A, 38B of the respective stalk rolls 28A, 28B, coupled respectively to the cast supports 40A, 40B, and also the protrusions 50A and 50B of the cast supports 40A, 40B, respectively. Focusing on the protrusion 50B (the description for the other protrusion 50A having the same or similar applicability and omitted here for brevity), the protrusion 50B comprises a knife edge 52 located at the top of the protrusion 50B, adjacent the rotatable stalk roll 28B. The knife edge 52 is a sharpened edge portion of the protrusion 50B, the protrusion 50B comprising in one embodiment a multi-edge surface element formed as part of the casting process that formed the cast support 40B. The knife edge 52 may be sharpened in a post-cast process (e.g., a machining operation, such as a milling operation) to form a cutting or severing edge. In some embodiments, the knife edge 52 may possess a sharp enough edge without a post-cast process. As indicated above, the protrusion 50B comprises a surface feature formed from the casting process (of the cast support 40B), such as a protrusion extending from a surface of the cast support 40B. In some embodiments, there may be only a single edge (i.e., the knife edge 52) that serves as a cutting edge, with the other edges of the protrusion comprising dull or non-sharpened edges. In some embodiments, additional edges of the protrusion 50B may be sharpened into cutting or knife edges, and in some embodiments, all edges may be un-sharpened. Although shown as a polygonal structure with a half-moon edge beneath the protrusion 50B that is adjacent a radial portion of the stalk roll 28A, some embodiments may use a protrusion of other types of geometrical configurations. As noted, the knife edge 52 is a top edge of the protrusion 50B that is adjacent the rotating stalk roll 28B. As noted, the protrusion 50B is located at the side of the stalk roll 28B adjacent a neighboring row unit stalk roll (as opposed to in between the pair of stalk rolls 28A, 28B of the row unit 22, with a similar relative arrangement for the other protrusion 50A adjacent the stalk roll 28A).

Figure 5:
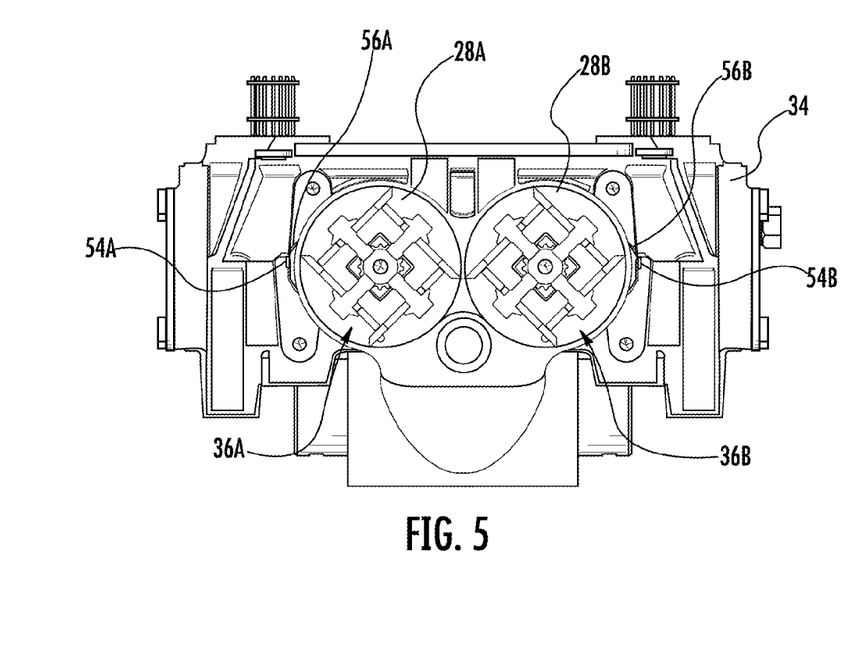
FIG. 5 is a schematic diagram showing a partial front elevation view of an embodiment of an integrated scraper system for an aft end of a row unit.

Reference is now made to FIG. 5, which illustrates in front elevation view protrusions 54A and 54B formed in the casting process that forms the body of the gearbox 34. One embodiment of an integrated scraper system may deploy the protrusions 54A and 54B in lieu of the protrusions 50A and 50B, or in some embodiments, the integrated scraper system may deploy a combination of the fore and aft protrusions 50 and 54. As shown, the protrusions 54A and 54B are of a similar structure and function as the protrusions 50A and 50B. In some embodiments, a different geometric construction may be used. The protrusions 54A and 54B accordingly are integrated into the cast body of the gearbox 34 and located adjacent respective openings 36A, 36B, serving as an interference or obstacle to plant material that begins to wrap around the aft end of the stalk rolls 28A, 28B, respectively, proximal to the connection between the stalk rolls 28A, 28B and the gearbox openings 36A, 36B. In one embodiment, the protrusions 54A and 54B, like the protrusions 50A and 50B, comprise knife edges 56A and 56B, respectively, at the top of the protrusions 54A and 54B adjacent the openings 36A and 36B, respectively. The protrusions 54A, 54B are formed in the casting process that forms the gearbox 34, and in one embodiment, the corresponding knife edges 56A and 56B are sharpened in a post-cast process (e.g., via machining operation, such as milled or lathe operations). In some embodiments, the cast process alone may suffice to cause sharpening of the knife edges 56A, 56B. The knife edges 56A, 56B enable cutting (severing) action when plant material is drawn between the knife edges 56A, 56B and the rotating stalk rolls 28A, 28B, respectively, proximal to the openings 36A, 36B, respectively. Although shown in FIG. 5 of a particular geometric construction, the protrusions 54A, 54B may be of other geometric configurations of larger or smaller design in some embodiments. In some embodiments, additional edges of the protrusions 54A, 54B may be sharpened, or in some embodiments, none of the edges are sharpened into knife edges.

Figure 6:
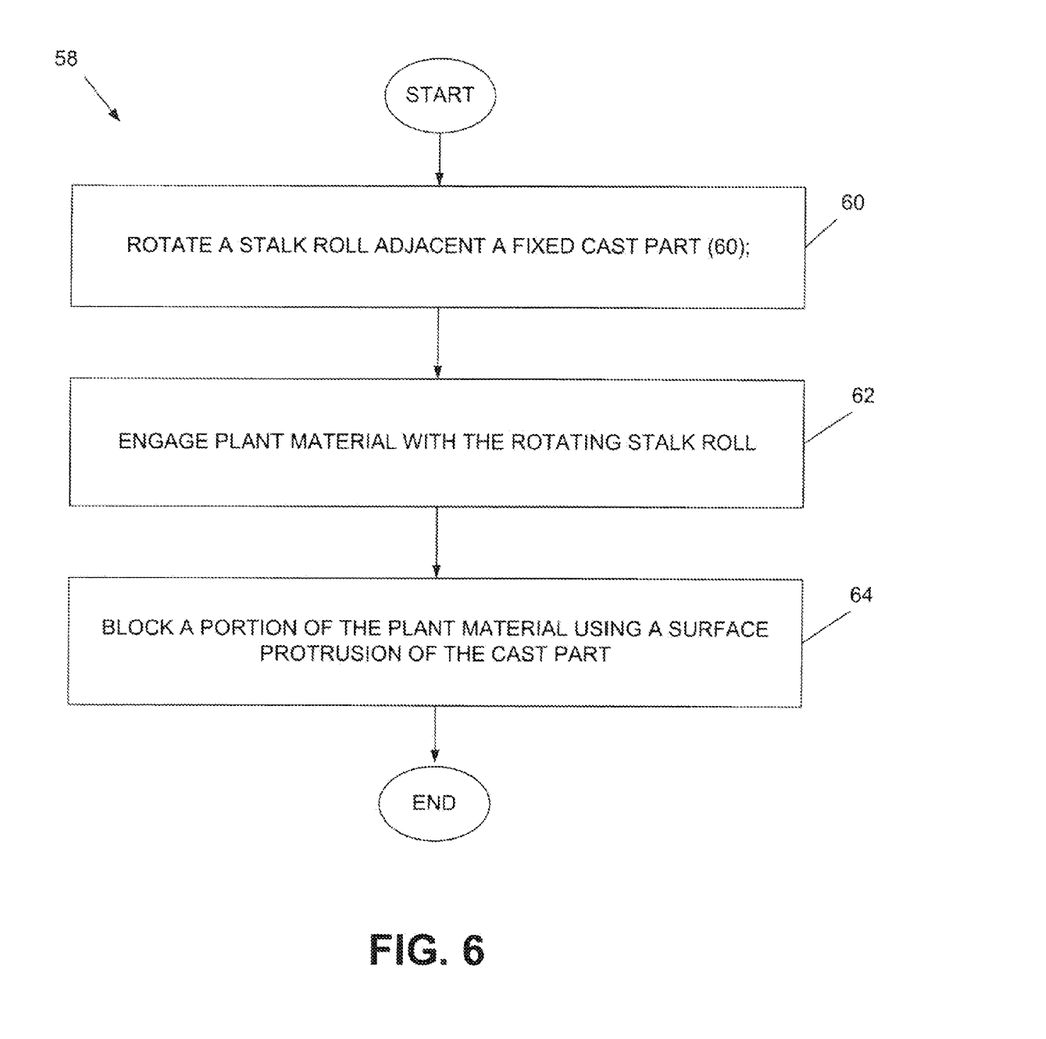
FIG. 6 is a flow diagram that illustrates an example embodiment of an integrated scraper method.

Having described some example embodiments of an integrated scraper system, it should be appreciated in view of the present disclosure that one embodiment of an integrated scraper method 58, depicted in FIG. 6, comprises rotating a stalk roll adjacent a fixed cast part (60); engaging plant material with the rotating stalk roll (62); and blocking a portion of the plant material using a surface protrusion of the cast part (64). Note that in some embodiments, additional steps may be employed by a row unit in some embodiments.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

What is claimed is:

1. A row unit for a corn header comprising:
a gearbox having a cast body and first and second rotatable shafts and first and second openings, the first and second shafts extending out respectively from the first and second openings in a fore and aft orientation;
first and second rotatable stalk rolls arranged in said fore and aft orientation, the first and second stalk rolls respectively coupled to the first and second shafts at the aft end; and
first and second cast supports secured to a frame of the row unit and extending perpendicular to said fore and aft orientation, the first and second stalk rolls respectively coupled on the fore end of the respective first and second stalk rolls to the first and second cast supports;
wherein formed from casting the first and second cast supports are respective first and second protrusions, the first and second protrusions comprising respective first and second knife edges, wherein the first and second protrusions extend rearward in said fore and aft orientation such that the first and second knife edges are located adjacent and to the side of the fore end of the respective first and second stalk rolls.

2. The row unit of claim 1, wherein other edges of the first and second protrusions lack knife edges.

3. The row unit of claim 1, wherein the first and second stalk rolls are rotatable in opposing directions.

4. The row unit of claim 1, wherein the first and second stalk rolls are coupled respectively to the first and second cast supports via a respective ball bearing arrangement.

5. The row unit of claim 1, wherein formed from casting the cast body and adjacent a side of the respective first and second openings are respective third and fourth protrusions having respective third and fourth knife edges, the third and fourth knife edges located adjacent the respective first and second stalk rolls.

6. A corn header, comprising:
- a plurality of row units disposed adjacent each other, each row unit comprising:
- a gearbox having a rotatable shaft and a cast body having an opening, the shaft extending out from the opening in a fore and aft orientation;
- a stalk roll arranged in said fore and aft orientation comprising a first end adapted to receive the shaft and an opposing second end, the first end and the second end operably coupled to the shaft; and
- a cast support coupled to the second end, the cast supports secured to a frame of the row unit and extending perpendicular to said fore and aft orientation, wherein formed from casting at least one of the cast support or the body is a protrusion comprising a knife edge, wherein the protrusion extends rearward in said fore and aft orientation such that the knife edge is located adjacent and to the side of the stalk roll.

7. The corn header of claim 6, wherein the cast support and the body each comprise first and second knife edges, respectively, one of the first and second knife edges including the knife edge, wherein the first and second knife edges are adjacent the stalk roll.

8. The corn header of claim 7, wherein the second knife edge is limited in location to a top edge of the protrusion.

9. The corn header of claim 7, wherein the first knife edge is limited in location to a top edge of the protrusion.

10. The corn header of claim 7, wherein the first knife edge comprises one edge among plural edges of the protrusion configured as a multi-edge surface element integrated into the case support, wherein other edges of the multi-edge element lack a knife edge.

11. The corn header of claim 6, wherein the second end is coupled to the cast support via a ball bearing arrangement.

12. The corn header of claim 6, wherein the second end includes a helical flute portion.

\* \* \* \* \*